United States Patent
Hashizume et al.

(10) Patent No.: US 10,871,775 B2
(45) Date of Patent: Dec. 22, 2020

(54) CONTROL DEVICE FOR PROPELLING SYSTEM

(71) Applicant: HONDA MOTOR CO., LTD., Toko (JP)

(72) Inventors: Takashi Hashizume, Wako (JP); Hiroshi Yamamoto, Wako (JP); Akifumi Fujima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 102 days.

(21) Appl. No.: 16/304,785

(22) PCT Filed: Mar. 31, 2017

(86) PCT No.: PCT/JP2017/013854
§ 371 (c)(1),
(2) Date: Nov. 27, 2018

(87) PCT Pub. No.: WO2018/179445
PCT Pub. Date: Oct. 4, 2018

(65) Prior Publication Data
US 2020/0026293 A1    Jan. 23, 2020

(51) Int. Cl.
*G05D 1/02* (2020.01)
*B63B 49/00* (2006.01)
(Continued)

(52) U.S. Cl.
CPC .......... *G05D 1/0206* (2013.01); *B63B 49/00* (2013.01); *B63H 25/02* (2013.01); *B63H 25/04* (2013.01)

(58) Field of Classification Search
USPC ........................................................ 701/21
See application file for complete search history.

(56) References Cited

U.S. PATENT DOCUMENTS 6,273,771 B1 * 8/2001 Buckley .............. B63H 21/213
114/144 RE
2003/0220724 A1    11/2003 Kaji
(Continued)

FOREIGN PATENT DOCUMENTS

EP    1 520 782 A2    4/2005
JP    11-326511       11/1999
(Continued)

OTHER PUBLICATIONS

International Search Report, dated Jun. 20, 2017 (Jun. 20, 2017), 1 page.
European Search Report dated Feb. 25, 2020, 7 pages.

*Primary Examiner* — Tyler D Paige
(74) *Attorney, Agent, or Firm* — Rankin, Hill & Clark LLP (57) ABSTRACT

A control device for a propelling system of a vessel that can support a safe sailing of the vessel while reducing the load, of a steersman by executing automatic sailing control on the vessel when the vessel enters or approaches a specific water area where the sailing is limited. When determining that a hull stays within the specific water area in a state where a revolution speed and a rotational direction of a propeller and a posture of an outboard engine are controlled based on a signal inputted from a controlling device, an ECU of the outboard engine switches the sailing of the hull to an automatic sailing where the revolution speed and rotational direction of the propeller and the posture of the outboard engine are controlled without the intervention of the controlling device.

12 Claims, 9 Drawing Sheets

(51) Int. Cl.
   *B63H 25/02*     (2006.01)
   *B63H 25/04*     (2006.01)

(56) References Cited

U.S. PATENT DOCUMENTS

| | | | |
|---|---|---|---|
| 2007/0178779 A1 | 8/2007 | Takada et al. | |
| 2012/0130570 A1* | 5/2012 | Pease | B63H 25/04 |
| | | | 701/21 |
| 2013/0102206 A1 | 4/2013 | Fujino et al. | |
| 2013/0297104 A1* | 11/2013 | Tyers | B63H 21/21 |
| | | | 701/21 |
| 2015/0378361 A1* | 12/2015 | Walker | G06T 7/75 |
| | | | 701/21 |
| 2016/0375972 A1* | 12/2016 | Andrasko | B63B 39/061 |
| | | | 440/1 |
| 2017/0227639 A1* | 8/2017 | Stokes | G01S 7/6272 |
| 2020/0026293 A1* | 1/2020 | Hashizume | B63H 25/04 |

FOREIGN PATENT DOCUMENTS

| | | |
|---|---|---|
| JP | 2003-341592 | 12/2003 |
| JP | 2006-290196 | 10/2006 |
| JP | 2009-037445 | 2/2009 |
| JP | 2012-022446 | 2/2012 |
| JP | 2013-86668 | 5/2013 |

\* cited by examiner

CONTROL DEVICE FOR PROPELLING SYSTEM

TECHNICAL FIELD

The present invention relates to a control device for a propelling system of a vessel.

BACKGROUND ART

Vessels are proposed which can sail or travel on a desired course by switching sailing methods between a sailing based on a manual operation and a sailing based on an autopilot (refer to Patent Documents 1 to 3).

PRIOR ART DOCUMENTS

Patent Documents

Patent Document 1: JP-A-2003-341592
Patent Document 2: JP-A-2013-86668
Patent Document 3: JP-A-2006-290196

SUMMARY OF THE INVENTION

Problem to be Solved by the Invention

When a vessel travels using the autopilot, once a destination is set, the vessel is automatically navigated to the desired destination without the intervention of a steersman. However, the vessel on the autopilot does not always travel on an efficient course. Additionally, there is a case where the vessel travels without a destination being determined clearly, in which case it is difficult to use the autopilot. Accordingly, it is considered to be preferable that the manual sailing is used mainly while the autopilot is used as an auxiliary.

Patent Documents 1 to 3 describe an vessel in which an autopilot operation and a manual operation can be switched based on an instruction from a steersman. That is, it is known to switch between the autopilot operation and the manual operation by the intention of the steersman. However, there has been made no study on how to use the autopilot as an auxiliary.

The invention has been made in view of the above circumstances, and an object of the invention is to provide a control device for a propelling system of a vessel which can support a safe sailing of the vessel while reducing the load of a steersman by executing automatically a sailing control on the vessel when the vessel enters a specific water area where the sailing of the vessel is limited or approaches the specific water area.

Means for Solving the Problem

The following seven configurations (1) to (7) will be provided to achieve the object.

(1) A control device (e.g., an ECU 21 which will be described later) for a propelling system (e.g., an outboard engine 20) of a vessel including:

a manual sailing control unit (e.g., a manual sailing control unit 21E) configured to control a revolution speed of a propeller included in a propelling system, a posture of the propelling system and a rotational direction of the propeller based on a signal inputted from a controlling device (e.g., a shift and throttle controller 34, a steering device 35, and a trim switch 36) for instructing the revolution speed, the posture and the rotational angle;

a positional information acquisition unit (e.g., a positional information acquisition unit 21A) configured to acquire positional information of a hull to which the propelling system is attached;

a determination unit (e.g., a determination unit 21C, 21c) configured to determine, based on the positional information and information on a specific water area where the sailing is limited, whether the hull stays within the specific water area or there is a possibility that the hull enters the specific water area; and an automatic sailing control unit (e.g., an automatic sailing control unit 21F, 21f) configured to automatically sail the hull by controlling the revolution speed, the posture and the rotational direction if it is determined that the hull stays within the specific water area or there is a possibility that the hull enters the specific water area.

(2) The control device for the propelling system according to (1), wherein if it is determined that the hull stays within a speed limiting water area as the specific water area where the hull is instructed to sail at a first sailing speed or slower, the automatic sailing control unit controls the revolution speed such that a sailing speed of the hull becomes equal to or slower than the first sailing speed.

(3) The control device for the propelling system according to (1) or (2), wherein if it is determined that the hull stays within a shallow water area or a water area with sunken rocks as the specific water area, the automatic sailing control unit controls a trim angle of the propelling system as the posture in such a direction that the propelling system moves away from the hull.

(4) The control device for the propelling system according to any one of (1) or (3), wherein if it is determined that the hull stays within a shallow water area, a water area with sunken rocks or a sailing prohibiting water area as the specific water area, the automatic sailing control unit controls a direction of the propelling system as the posture such that the hull sails out of the specific water area.

(5) The control device for the propelling system according to (1), wherein if it is determined that there is a possibility that the hull enters a shallow water area, a water area with sunken rocks or a sailing prohibiting water area as the specific water area, the automatic sailing control unit controls a direction of the propelling system as the posture such that the hull does not enter the specific water area.

(6) The control device for the propelling system according to any one of (1) to (5), further comprising:

a notification unit (e.g., a notification unit 21D, 21d) configured to execute notification if it is determined that the hull stays within the specific water area or there is a possibility that the hull enters the specific water area.

(7) The control device for the propelling system according to (6), wherein the notification unit displays a positional relationship between the position of the hull and the specific water area on a display unit.

(8) The control device for the propelling system according to (6) or (7), wherein the notification unit displays details of the automatic sailing of the hull on the display unit.

Effects of the Invention

According to the control device of (1), when the hull stays within the specific water area or there is a possibility that the hull enters the specific water area, the hull is automatically sailed by the automatic sailing control unit. Therefore, it is possible to support the safe sailing of the hull while reducing the load of the steersman.

According to the control device of (2), when the hull stays within the speed limiting water area, the hull is sailed automatically while observing the limited sailing speed. Therefore, a safe sailing complying with the rules is enabled without depending upon the skill of the steersman.

According to the control device of (3), when the hull stays within the shallow water area or the water area with sunken rocks, the hull is sailed automatically with the propelling system controlled to be directed in the direction in which the propelling system moves away from the hull. Therefore, a safe sailing preventing a contact of the propelling system with the seabed is enabled without depending upon the skill of the steersman.

According to the control device of (4), when the hull stays within the shallow water area, the water area with sunken rocks or the sailing prohibiting water area, the hull can automatically be sailed out of these water areas. Therefore, a safe sailing is enabled without depending upon the skill of the steersman.

According to the control device of (5), when there is a possibility that the hull enters the shallow water area, the water area with sunken rocks or the sailing prohibiting water area, the hull can automatically be sailed such that the hull does not enter these water areas. Therefore, a safe sailing is enabled without depending upon the skill of the steersman.

According to the control device of (6), since the steersman can confirm in advance that the movable range of the controlling device is limited, that the trim angle is changed or that the hull is restricted from entering the specific water area, it is possible to support a safe sailing.

According to the control device of (7), since the steersman can recognize the positional relationship between the position of the hull and the specific water area, it is possible to reduce the psychological load of the steersman.

According to the control device of (8), since the steersman can recognize the details of the control executed by the automatic sailing control unit, it is possible to reduce the psychological load of the steersman.

DETAILED DESCRIPTION OF EMBODIMENTS

Hereinafter, an embodiment of the invention will be described by reference to the drawings.

Figure 1:
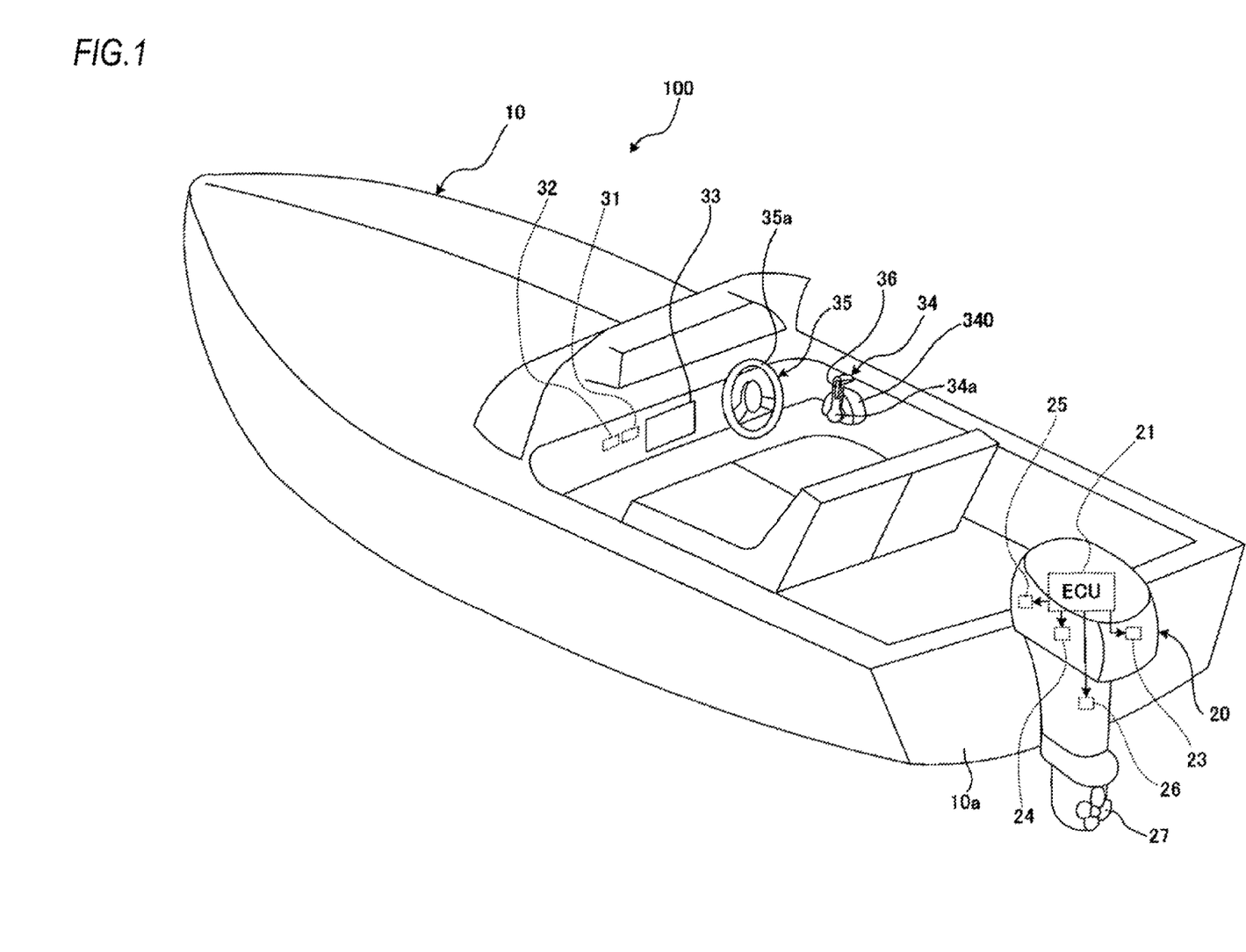
FIG. 1 is a schematic view showing an external configuration of a vessel 100 which includes an ECU (Electronic Control Unit) which constitutes an embodiment of a control device for a propelling system according to the invention.

FIG. 1 is a schematic view showing an external configuration of a vessel 100 which includes an Electronic Control Unit (ECU) which is an example of a control device for a propelling system according to an embodiment of the invention.

The vessel 100 includes a hull 10, an outboard engine 20 as a propelling system attached to a transom 10a of the hull 10, a directionسensor 31 provided on the hull 10, a Global Positioning System (GPS) receiver 32, a display unit 33 configured by a liquid crystal display device, a shift and throttle controller 34, a steering device 35, and a trim switch 36.

The direction sensor 31 detects a direction in which a bow of the hull 10 is directed and outputs a signal indicating the detected direction.

The GPS receiver 32 detects a position of the hull 10 based on a signal received from a GPS satellite and outputs a signal indicating the detected position.

The outboard engine 20 includes an ECU 21, an internal combustion engine whose illustration is omitted, a propeller 27 which is rotated by means of power from the internal combustion engine, a throttle motor 23, a steering motor 24, a trim angle control motor 25 and a shift motor 26.

The throttle motor 23 is an actuator for driving a throttle valve of the internal combustion engine to be opened and closed.

The steering motor 24 is an actuator for driving a steering mechanism for turning the outboard engine 20 about a vertical axis thereof so as to change the direction of the outboard engine 20 with respect to a direction in which the bow and the transom 10a of the hull 10 are connected together.

The trim angle control motor 25 is an actuator for driving a trim angle control mechanism for controlling a trim angle of the outboard engine 20 relative to the hull 10.

The shift motor 26 is an actuator for driving a shift mechanism for switching rotational directions of the propeller 27 clockwise and counterclockwise.

The ECU 21 is configured to communicate with the direction sensor 31, the GPS receiver 32, the display unit 33, the shift and throttle controller 34, the steering device 35 and the trim switch 36 by wire or in a wireless manner.

The ECU 21 is connected with the direction sensor 31, the GPS receiver 32, the display unit 33, the shift and throttle controller 34, the steering device 35 and the trim switch 36 through a communication system (for example, NMEA 2000, or specifically, Controlled Area Network (CAN)) which is specified under, for example, National Marine Electronics Association (NMEA) of the United States of America.

The shift and throttle controller 34 includes a rotational shaft whose illustration is omitted and which is supported rotatably in an interior of a remote control box 340 which is disposed near a steering or control seat, a shift and throttle lever 34a which is attached to the rotational shaft to freely oscillate forwards and backwards from its initial position, and a lever position sensor whose illustration is omitted and which is disposed in the interior of the remote control box 340.

The lever position sensor detects an operated position of the shift and throttle lever 34*a* to which the shift and throttle lever 34*a* is operated by the steersman (a rotational angle of the rotational shaft of the shift and throttle controller 34) and outputs a signal according to the operated position so detected. The signal outputted from the lever position sensor is sent to the ECU 21.

This rotational angle is set at, for example, 0 degree such that the shift and throttle lever 34*a* is in its initial position. Then, when the shift and throttle lever 34*a* is pushed to tilt forwards beyond the initial position, the rotational angle changes by 90 degrees, while when the shift and throttle lever 34*a* is pulled to tilt backwards beyond the initial position, the rotational angle changes by −90 degrees.

An absolute value of the rotational angle of the rotational shaft of the shift and throttle controller 34 is controlled to be associated with the throttle valve position of the internal combustion engine of the outboard engine 20.

When receiving a signal corresponding to a rotational angle of the rotational shaft of the sift and throttle controller 34, the ECU 21 controls the throttle motor 23 such that the throttle valve position takes a value which corresponds to an absolute value of the rotational angle of the rotational shaft. A revolution speed of the propeller 27 becomes greater as the absolute value of the rotational angle of the rotational shaft of the shift and throttle controller 34 increases.

Signs of rotational angles of the rotational shaft of the shift and throttle controller 34 (rotational directions of the shift and throttle lever 34*a*) are controlled to be associated with rotational directions of the propeller 27.

For example, a rotational angle with a positive sign is associated with a forward direction as a rotational direction of the propeller 27, while a rotational angle with a negative sign is associated with a backward direction as a rotational direction of the propeller 27. The hull 10 travels forwards by the propeller 27 being rotated forwards, while the hull 10 travels backwards by the propeller 27 being rotated backwards.

When receiving a signal corresponding to a rotational angle of the rotational shaft of the sift and throttle controller 34, the ECU 21 controls the shift motor 26 such that the rotational direction of the propeller 27 corresponds to the rotational direction of the rotational shaft.

The shift and throttle controller 34 functions as a controlling device configured to instruct the revolution speed of the propeller 27 and the rotational direction of the propeller 27 which is included in the outboard engine 20.

Although the shift and throttle controller 34 can be configured by a single device for instructing the revolution speed and rotational direction of the propeller, the shift and throttle controller 34 may be configured by a controlling device for instructing the revolution speed of the propeller 27 and a controlling device for instructing the rotational direction of the propeller 27 which are provided separately.

The steering device 35 includes a steering wheel 35*a* which is configured to turn freely about a shaft as a rotational shaft, and a steering angle sensor which is provided near the shaft to detect a steering angle of the steering wheel 35*a* and outputs a signal corresponding to the steering angle detected. A signal corresponding to the steering angle outputted from the steering angle sensor is sent to the ECU 21.

The steering angle of the steering wheel 35*a* and the turning angle of the outboard engine 20 about the vertical axis are controlled to be associated with each other. When receiving a signal corresponding to a steering angle of the steering wheel 35*a*, the ECU 21 controls the steering motor 24 such that the turning angle of the outboard engine 20 becomes a turning angle corresponding to the steering angle of the steering wheel 35*a*.

The steering device 35 functions as a controlling device for instructing a posture that the outboard engine 20 takes (a direction of the outboard engine 20 which is determined by a turning angle thereof about the vertical axis)

The trim switch 36 is integrated with the shift and throttle lever 34*a* in the example shown in FIG. 1.

The trim switch 36 includes a movable member which can move forwards and backwards from its initial position and a position sensor for detecting a position of the movable member to output a signal corresponding to the detected position. A signal corresponding to the position of the movable member which is outputted from the position sensor is sent to the ECU 21.

The ECU 21 controls the trim angle control motor 25 to increase the trim angle by a predetermined amount step by step while it is receiving a signal indicating that the movable member is positioned further forwards than the initial position from the trim switch 36.

The ECU 21 controls the trim angle control motor 25 to decrease the trim angle by a predetermined amount step by step while it is receiving a signal indicating that the movable member is positioned further backwards than the initial position from the trim switch 36.

The trim switch 36 functions as a controlling device for instructing a posture (a trim angle) that the outboard engine 20 takes.

Figure 2:
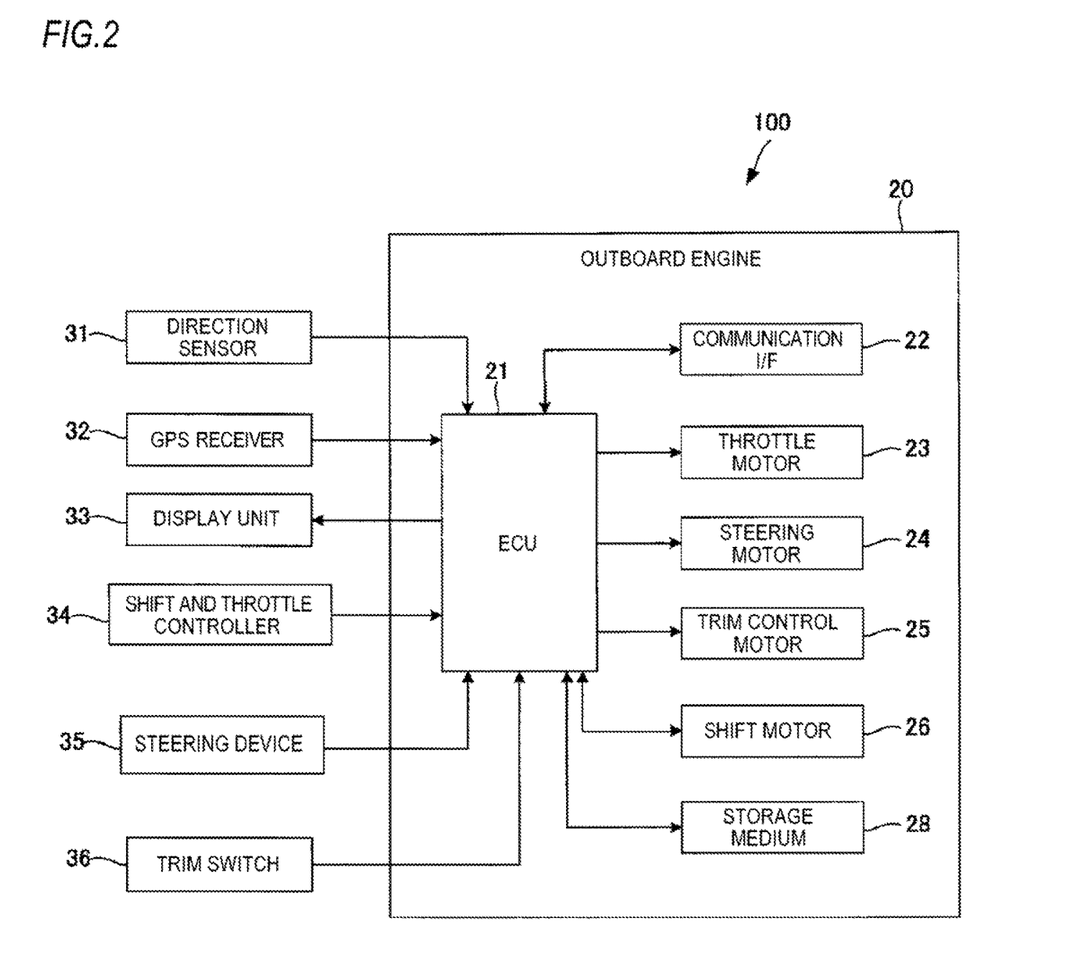
FIG. 2 is a block diagram showing a main configuration of pieces of hardware of the vessel 100 shown in FIG. 1.

FIG. 2 is a block diagram showing a main configuration of hardware of the vessel 100 shown in FIG. 1.

The outboard engine 20 includes the ECU 21, a communication interface (I/F) 22, the throttle motor 23, the steering motor 24, the trim angle control motor 25, the shift motor 26 and a storage medium 28. Although not shown in FIG. 2, the outboard engine 20 further includes the internal combustion engine, the steering mechanism, a trim angle controlling mechanism and the propeller 27.

The communication I/F 22 is an interface for communicating with an electronic device such as a smartphone which can connect with a mobile telephone network or an interface for connecting direct with the mobile telephone network.

The storage medium 28 stores information on specific water areas where the sailing of the vessel 100 is limited and includes a semiconductor memory and the like, for example, a flash memory. The storage medium 28 may be of a portable type which can be detachably attached to the outboard engine 20.

The specific water area includes a speed limiting water area designated as a water area within a harbor or a bay where vessels are required to sail at a predetermined sailing speed (a first sailing speed), a shallow water area, a water area where sunken rocks lie under the surface of water or a sailing prohibited water area.

The ECU 21 includes a microcomputer including a Read Only Memory (ROM) and a Random Access Memory (RAM).

Figure 3:
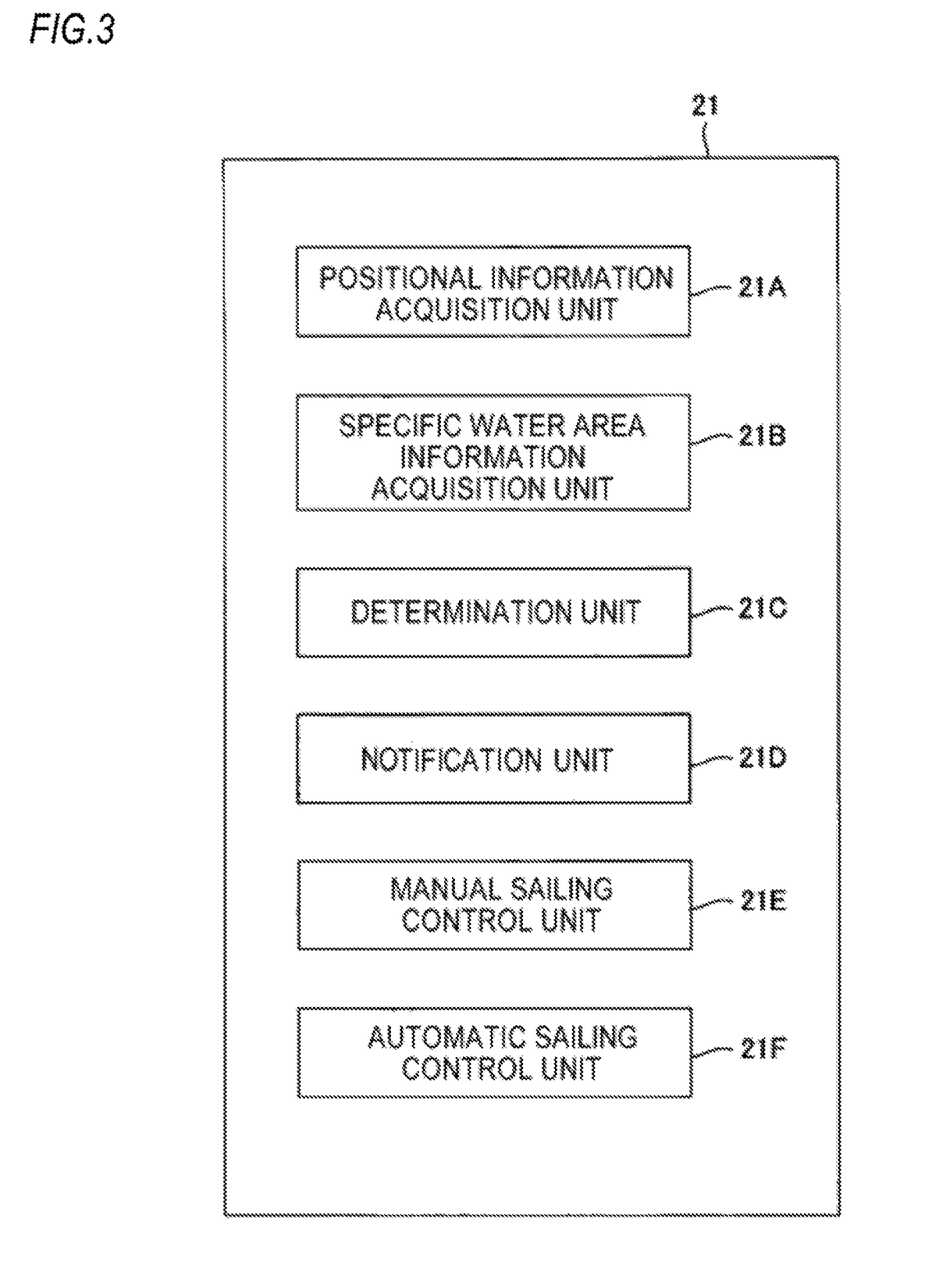
FIG. 3 is a diagram showing an example of functional blocks of an ECU 21 shown in FIG. 2.

FIG. 3 is a diagram showing an example of functional blocks of the ECU 21 shown in FIG. 2.

In the ECU 21, a processor executes programs installed in the ROM which is included therein and cooperates with the various types of hardware devices of the outboard engine 20 and the vessel 100, whereby the ECU 21 functions as a positional information acquisition unit 21A, a specific water area information acquisition unit 21B, a determination unit 21C, a notification unit 21D, a manual sailing control unit 21E and an automatic sailing control unit 21F.

The positional information acquisition unit 21A acquires positional information indicating a position of the hull 10 periodically from the GPS receiver 32 and stores the information acquired in the RAM.

The specific water area information acquisition unit 21B acquires information on the specific water area periodically from an exterior server via the communication I/F 22 and stores the information acquired in the storage medium 28. It is also possible to acquire information on the specific water area using an Automatic Identification System (AIS) in place of the communication I/F 22.

The determination unit 21C determines whether the hull 10 stays in the specific water area based on the information regarding the specific water area which is acquired by the specific water area information acquisition unit 21B and the information on the position of the hull 10 which is acquired by the positional information acquisition unit 21A.

When the determination unit 21C determines that the hull 10 stays in the specific water area, the notification unit 21D notifies the steersman that the hull 10 is in such a state and that the operation of the hull 10 will be switched to an automatic one.

For example, the notification unit 21D notifies the steersman by displaying a message notifying that the vessel 100 stays within the specific water area and that the automatic operation is started on the display unit 33. In addition, the notification unit 21D notifies the steersman of this message by causing the message to be outputted from a speaker set on the hull 10 in the form of audio.

The manual sailing control unit 21E executes a manual speed control in which the revolution speed of the propeller 27 is controlled via the throttle motor 23 and a manual shift control in which the rotational direction of the propeller 27 is controlled via the shift motor 26 based on a signal corresponding to the position of the shift and throttle lever 34a which is inputted from the shift and throttle controller 34.

The manual sailing control unit 21E executes a manual steering control in which the direction of the outboard engine 20 is controlled via the steering motor 24 based on a signal corresponding to the steering angle of the steering wheel 35a which is inputted from the steering device 35.

The manual sailing control unit 21E executes a manual trim angle control in which the trim angle of the outboard engine 20 is controlled by controlling the trim angle control motor 25 based on a signal corresponding to the position of the movable member which is inputted from the trim switch 36.

When the determination unit 21C determines that the hull 10 stays within the specific water area, the automatic sailing control unit 21F controls the throttle motor 23, the steering motor 24, the trim angle control motor 25 and the shift motor 26 without the intervention of the corresponding control units so that the hull 10 is controlled automatically.

Figure 4:
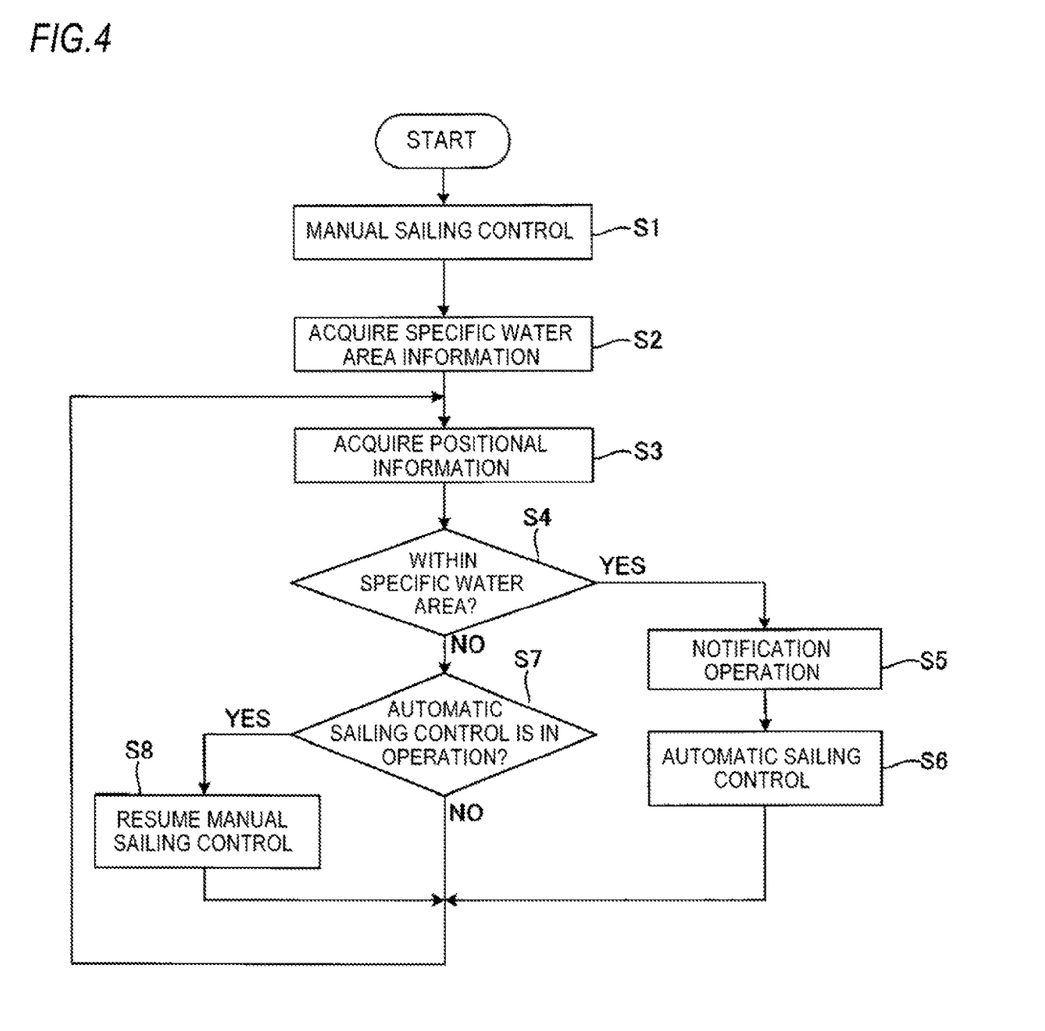
FIG. 4 is a flowchart illustrating operations of the ECU 21 shown in FIG. 2.

FIG. 4 is a flowchart illustrating operations of the ECU 21 shown in FIG. 2. It is understood that information on a destination is stored in the storage medium 28 of the ECU 21 of the outboard engine 20 in advance by the steersman.

When the outboard engine 20 is actuated to operate, the manual sailing control unit 21E starts a manual sailing control (Step S1).

Namely, when the steersman operates the sift and throttle controller 34, at least one of the revolution speed and the rotational direction of the propeller 27 is changed according to the operation performed by the steersman. Additionally, when the steersman operates the steering device 35, the direction of the outboard engine 20 is changed according to the operation performed by the steersman. In addition, when the steersman operates the trim switch 36, the trim angle is changed according to the operation performed by the steersman.

Next, the specific water area information acquisition unit 21B acquires specific water area information and stores the information in the storage medium 28 (Step S2). It should be noted that the specific water area information may be stored manually in the storage medium 28 by the steersman.

Thereafter, when a predetermined timing is reached, the positional information acquisition unit 21A acquires positional information of the hull 10 and stores the information in the RAM (Step S3).

After Step S2 and Step S3, the determination unit 21C determines whether the hull 10 stays in the specific water area by comparing the specific water area information stored in Step S2 with the positional information stored in Step S3 (Step S4).

If the determination unit 21 determines that the hull 10 stays within the specific water area (Step S4: YES), the notification unit 21D executes the notification operation described above (Step S5).

Thereafter, the manual sailing control unit 21E nullifies a manual speed control, a manual shift control, a manual steering control and a manual trim angle control, shifting to an automatic sailing control in which the automatic sailing control unit 21F controls the throttle motor 23, the steering motor 24, the trim angle control motor 25 and the shift motor 26 irrespective of the operation thereof by the steersman (Step S6).

The automatic sailing control executed in Step S6 includes, for example, the following patterns depending upon which specific water area the hull 10 stays in.

(First Automatic Sailing Control with the Hull 10 Staying the Speed Limiting Water Area)

The automatic sailing control unit 21F acquires information on the sailing speed of the hull 10 based on information from the GPS receiver 32 or information from a speedometer (not shown) which is provided on the hull 10. Then, the automatic sailing control unit 21F controls a throttle valve position via the throttle motor 23 such that the sailing speed of the hull 10 does not exceed a maximum limited sailing speed based on the sailing speed of the hull 10 and the information on the speed limiting water area (a range and the maximum limited sailing speed of the water area).

The automatic sailing control unit 21F controls the trim angle to be an angle at which an optimum riding conformity that matches, for example, the sailing speed of the hull 10 can be attained, fixes the trim angle to the value of a trim angle which is controlled by the manual sailing control unit 21E until then or controls the trim angle to become a value which is determined in advance.

Additionally, the automatic sailing control unit 21F fixes the direction of the outboard engine 20 to a direction in which the outboard engine 20 has been directed by the manual sailing control unit 21E by then or controls the direction of the outboard engine 20 to match the destination. The automatic control unit 21F controls the rotational direction of the propeller 27 such that the propeller 27 rotates in the forward direction.

(Second Automatic Sailing Control with the Hull 10 Staying in the Shallow Water Area or the Water Area with Sunken Rocks)

The automatic sailing control unit 21F controls the trim angle control motor 25 so that the trim angle is controlled such that the outboard engine 20 moves away from the hull 10 (trimming up).

The automatic sailing control unit 21F controls the throttle valve position to be a value at which an optimum sailing speed that matches, for example, the trim angle can be attained, fixes the throttle valve position to the value of a throttle valve position which has been controlled by the manual sailing control unit 21E until then or controls the throttle valve position to become a value which is determined in advance.

Additionally, the automatic sailing control unit 21F fixes the direction of the outboard engine 20 to a direction in which the outboard engine 20 has been directed by the manual sailing control unit 21E by then or controls the direction of the outboard engine 20 to match the destination. The automatic control unit 21F controls the rotational direction of the propeller 27 such that the propeller 27 rotates in the forward direction.

(Third Automatic Sailing Control with the Hull 10 Staying in the Shallow Water Area, the Water Area with Sunken Rocks or in the Sailing Prohibition Water Area)

The automatic sailing control unit 21F controls a sailing course of the hull 10 by controlling the steering motor 24 based on information on the specific water area positional information of the hull 10 and directional information detected by the direction sensor 31 such that the hull 10 sails out of the specific water area.

The automatic sailing control unit 21F fixes the throttle valve position to, for example, the value of a throttle valve position which has been controlled by the manual sailing control unit 21E until then or controls the throttle valve position to become a value at which a predetermined speed can be attained.

In addition, the automatic sailing control unit 21F fixes the trim angle to, for example, the value of a trim angle which has been controlled by the manual sailing control unit 21E until then, controls the trim angle to become an angle matching the sailing speed or controls the trim angle to become an angle determined in advance. The automatic control unit 21F controls the rotational direction of the propeller 27 such that the propeller 27 rotates in the forward direction.

It should be noted that the first automatic sailing control, the second automatic sailing control and the third automatic sailing control can be combined as required.

For example, when the hull 10 is staying in the speed limiting water area and the shallow water area, that is, in a water area where the sailing speed is limited and which is shallow, the automatic sailing control 21F controls the throttle valve position according to the first automatic sailing control and controls the trim angle, the direction of the outboard engine 20 and the rotational direction of the propeller 27 according to the second automatic sailing control.

Additionally, when the hull 10 is staying in the shallow water area and the water area with sunken rocks, that is, in a water area which is shallow and where sunken rocks lies under the surface of water, the automatic sailing control unit 21F controls the direction of the outboard engine 20 according to the third automatic sailing control and controls the trim angle, the throttle valve position and the rotational direction of the propeller 27 according to the second automatic sailing control.

Figure 5:
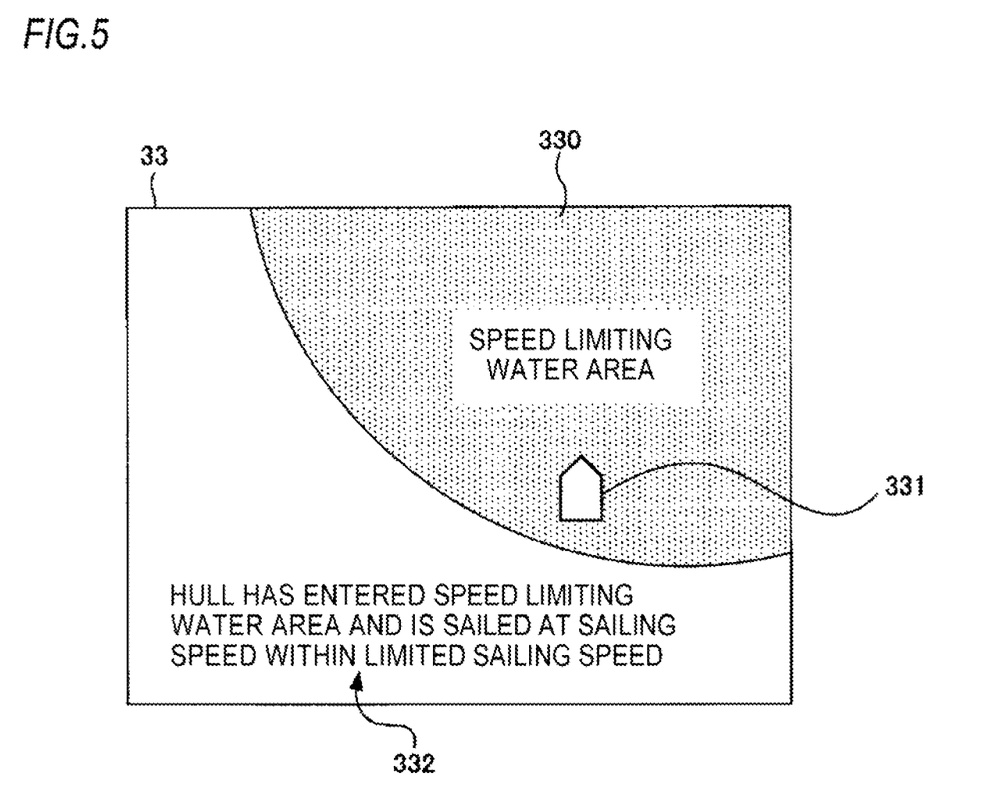
FIG. 5 is a schematic diagram showing an example of a notification operation performed by a notification unit 21D when a first automatic sailing control is performed.

FIG. 5 is a schematic diagram showing an example of a notification operation performed by the notification unit 21D when the first automatic sailing control is performed.

As shown in FIG. 5, the notification unit 21D notifies the steersman of the current situation by displaying an image 330 showing the speed limiting water area on the sailing course, an image 331 showing the position of the hull 10 on the sailing course and a message 332 notifying that the hull 10 enters the speed limiting water area and hence, the hull 10 is automatically sailed at a sailing speed which is equal to or slower than a speed limit on the display unit 33. The images 331 and 331 constitute information notifying a positional relationship between the specific water area and the hull 10. The message 332 constitutes information notifying the details of the automatic sailing control.

Figure 6:
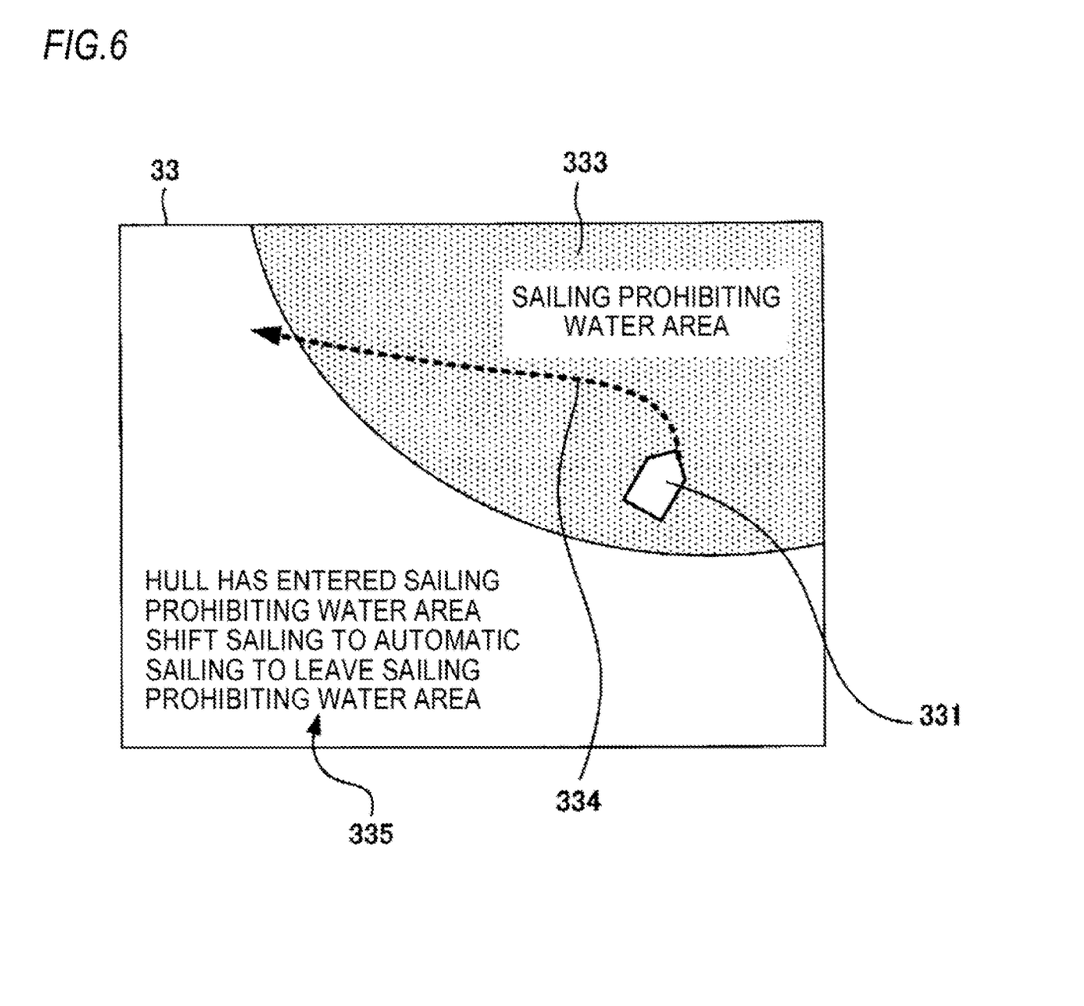
FIG. 6 is a schematic diagram showing an example of a notification operation performed by the notification unit 21D when a third automatic sailing control is performed.

FIG. 6 is a schematic diagram showing an example of a notification operation performed by the notification unit 21D when the third automatic sailing control is performed.

As shown in FIG. 6, the notification unit 21D notifies the steersman of the current situation by displaying an image 333 showing the sailing prohibiting water area on the sailing course, an image 331 showing the position of the hull 10 on the sailing course, a message 335 notifying that the hull 10 enters the sailing prohibiting water area and hence, the sailing of the hull 10 is switched to the automatic sailing control to leave the sailing prohibiting water area, and an image 334 indicating a scheduled sailing course of the hull 10 based on the third automatic sailing control on the display unit 33. The images 331 and 331 constitute information notifying a positional relationship between the specific water area and the hull 10. The message 335 and the image 334 constitute information notifying the details of the automatic sailing.

The steersman can recognize that the manual sailing control is nullified and the control of the hull is now switched to the automatic sailing control and the details of the automatic sailing by looking at the images illustrated in FIG. 5 or 6.

If it is determined in the determination made in Step S4 that the hull 10 does not stay within the specific water area (Step S4: NO), in case the automatic sailing control is being executed by the automatic sailing control unit 21F (Step S7: YES), this automatic sailing control is ended, and the control by the manual sailing control unit 21F is resumed (Step S8).

On the other hand, if the automatic sailing control is not executed by the automatic sailing control unit 21F (Step S7: NO), the flow of operations by the ECU 21 returns to Step S3. The flow of operations also returns to Step S3 after Steps S6 and S8. Then, when the positional information is updated in Step S3, the operations in Step S4 and thereafter are performed again.

When the manual sailing control is resumed in Step S8, it is preferable that the notification unit 21D notifies a message that the automatic sailing is ended on the display unit 33 or via the speaker. This enables the steersman to resume the control of the hull smoothly.

Thus, according to the outboard engine 20, when the hull 10 stays within, for example, the speed limiting water area, the throttle valve position is automatically controlled by the ECU 21, whereby the hull 10 is automatically sailed. Therefore, even though the steersman is not accustomed to manual steering in such a water area, a safe sailing observing the limited sailing speed is enabled.

In addition, according to the outboard engine 20, when the hull 10 stays within, for example, the shallow water area or the water area with sunken rocks, the automatic sailing is executed with the outboard engine 20 trimmed up. Therefore, even though the steersman is not accustomed to manual steering in such a water area, a safe sailing is enabled by preventing a contact of the outboard engine 20 with the seabed.

Additionally, according to the outboard engine 20, when the hull 10 stays within, for example, the shallow water area, the water area with sunken rocks, or the sailing speed limiting water area, the automatic sailing is executed such that the hull 10 is sailed out of these water areas. Therefore, even though the steersman is not accustomed to manual steering in such a water area, the outboard engine 20 can be prevented from being brought into contact with the seabed. Even when the hull 10 enters the sailing prohibiting water area without the steersman noticing the fact, the hull 10 can sail out of the sailing prohibiting water area in an early stage, thereby making it possible to sail safely while observing the rules.

According to the outboard engine 20, when the hull 10 sails on the course out of the specific water area, the steersman can sail or control the hull 10 according to the steersman's intention. Therefore, the steersman can not only sail the hull 10 according to the steersman's preference but also sail the hull 10 freely with no specific destination being determined.

According to the outboard engine 20, the steersman can recognize the positional relationship between the specific water area and the hull 10 or the details of the automatic sailing by looking at the images shown in FIGS. 5 and 6. In this way, the steersman can be freed from the anxiety felt by the hull 10 being sailed automatically by recognizing the controls executed by the ECU 21.

Figure 7:
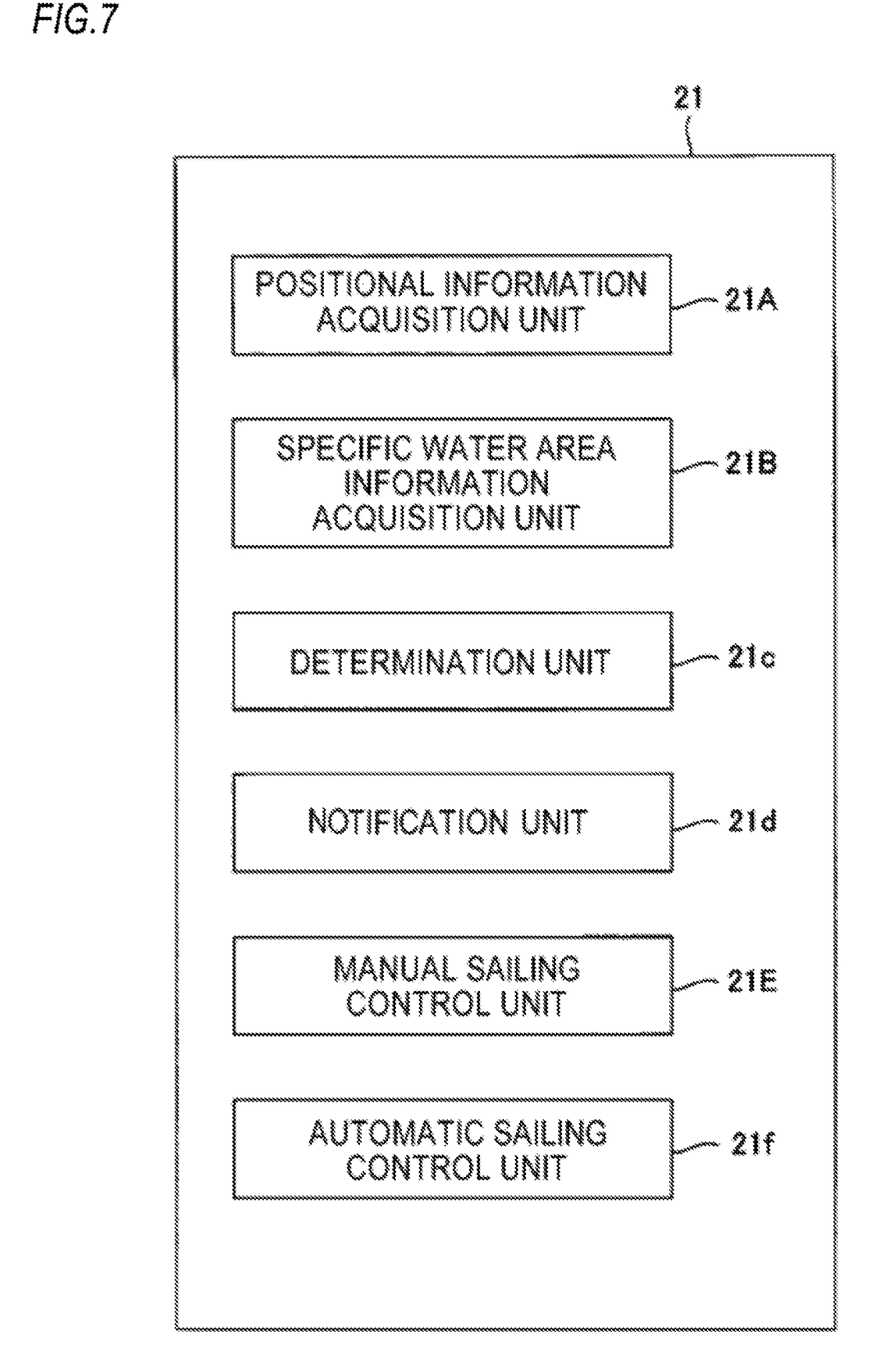
FIG. 7 is a diagram showing a modified example of functional blocks of the ECU 21 shown in FIG. 3.

FIG. 7 is a diagram showing a modified example of functional blocks of the ECU 21 shown in FIG. 3. In FIG. 7, the same reference numerals will be given to configurations similar to those shown in FIG. 3.

An ECU 21 shown in FIG. 7 has the similar configuration to that shown in FIG. 3 except that the determination unit 21D is modified into a determination unit 21c, the notification unit 21D into a notification unit 21d and the automatic sailing control unit 21F into an automatic sailing control unit 21f.

The determination unit 21c determines whether there is a possibility that a hull 10 enters a shallow water area, a water area with sunken rocks or a sailing prohibiting water area as a specific water area based on information regarding the specific water area which is acquired by a specific water area information acquisition unit 21B and information on the position of the hull 10 which is acquired by a positional information acquisition unit 21A.

For example, the determination unit 21c acquires information on a sailing speed of a vessel 100 based on information from a GPS receiver 32 or information from a speedometer (not shown) which is provided on the hull 10 and acquires further information on a direction in which the vessel 100 sails from a direction sensor 31. Then, the determination unit 21C determines whether the specific water area exists on a sailing course of the hull 10 based on the positional information and directional information of the hull 10 and the information on the specific information.

When determining that the specific water area exists on the sailing course of the hull 10, the determination unit 21c calculates a distance from a current position of the hull 10 to the specific water area and determines that there is a possibility that the hull 10 enters the specific water area when the calculated distance is equal to or shorter than a threshold which is determined in advance.

In addition, the determination unit 21c calculates a shortest distance between the hull 10 and the specific water area based on the information on the specific water area and the positional information of the hull 10 and determines that there is a possibility that the hull 10 enters the specific water area when the calculated shortest distance is equal to or shorter than a threshold which is determined in advance.

When the determination unit 21c determines that there is a possibility that the hull 10 enters the specific water area, the notification unit 21d notifies the steersman that the hull 10 is in such a state and that the operation of the hull 10 will be switched to an automatic sailing. A notification method executed by the notification unit 21d is similar to that by the notification unit 21D, and hence, the description thereof will be omitted here.

The automatic sailing control unit 21f shifts the control of the hull 10 to an automatic sailing control when the determination unit 21c determines that there is a possibility that the hull 10 enters the specific water area and controls the direction of the outboard engine 20 such that the hull 10 does not enter the specific water area.

Figure 8:
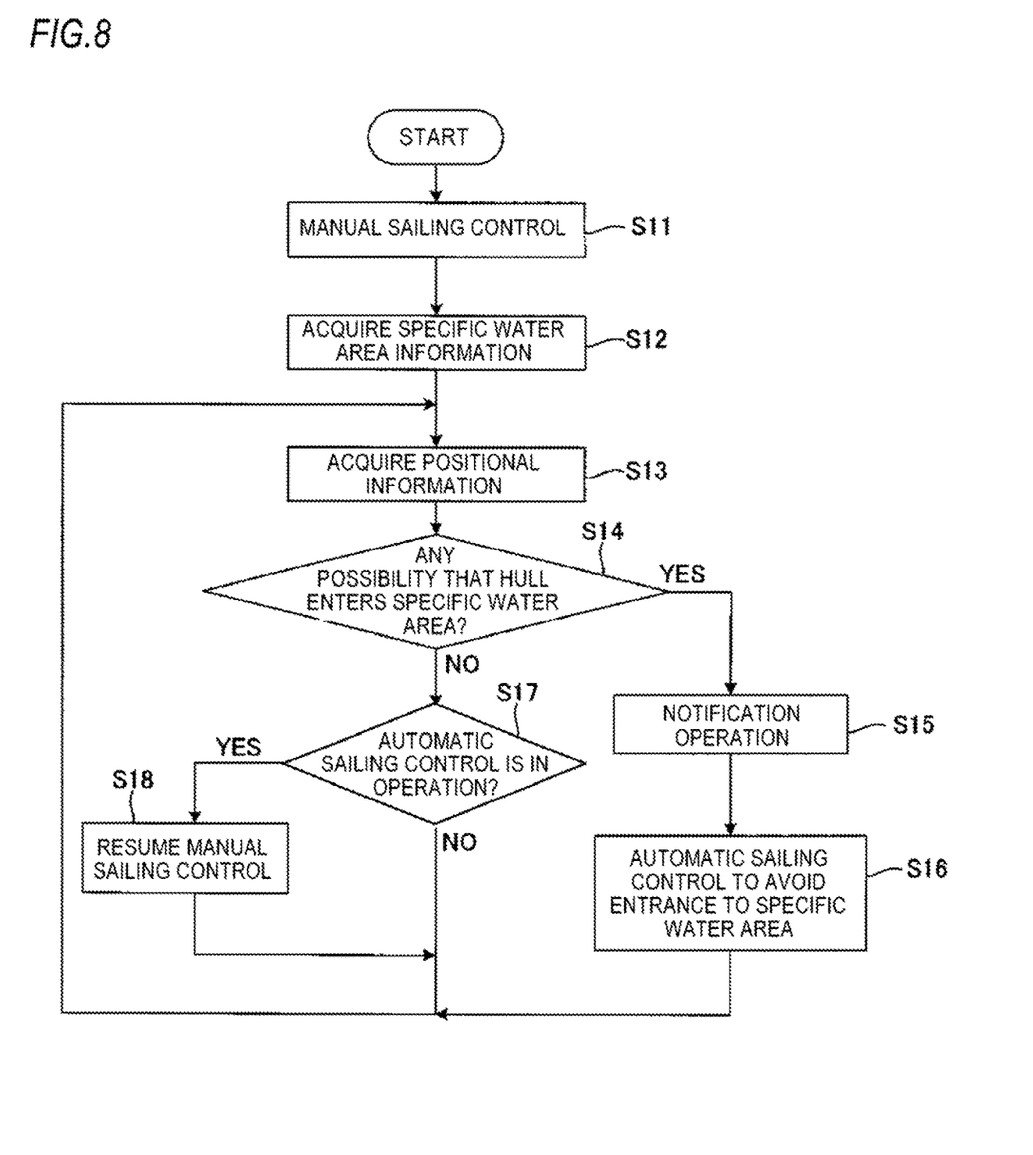
FIG. 8 is a flowchart illustrating operations of the ECU 21 shown in FIG. 7.

FIG. 8 is a flowchart illustrating operations of the ECU 21 shown in FIG. 7.

When the outboard engine 20 is actuated to operate a manual sailing control unit 21E starts a manual sailing control (Step S11).

Additionally, the specific water area information acquisition unit 21B acquires specific water area information and stores the information in a storage medium 28 (Step S12). It should be noted that the specific water area information may be stored manually in the storage medium 28 by the steersman.

Thereafter, when a predetermined timing is reached, the positional information acquisition unit 21A acquires positional information of the hull 10 and stores the information in a RAM (Step S13).

After Steps S12 and S13, the determination unit 21c determines whether there is a possibility that the hull 10 enters the shallow water area, the water area with sunken rocks or the sailing prohibiting water area based on the specific water area information stored in Step S12, the positional information stored in Step S13 and the directional information acquired from the direction sensor 31 (Step S14).

If the determination unit 21c determines that there is a possibility that the hull 10 enters the shallow water area, the water area with sunken rocks or the sailing prohibiting water area (Step S14: YES), the notification unit 21d executes a notification operation (Step S15).

Figure 9:
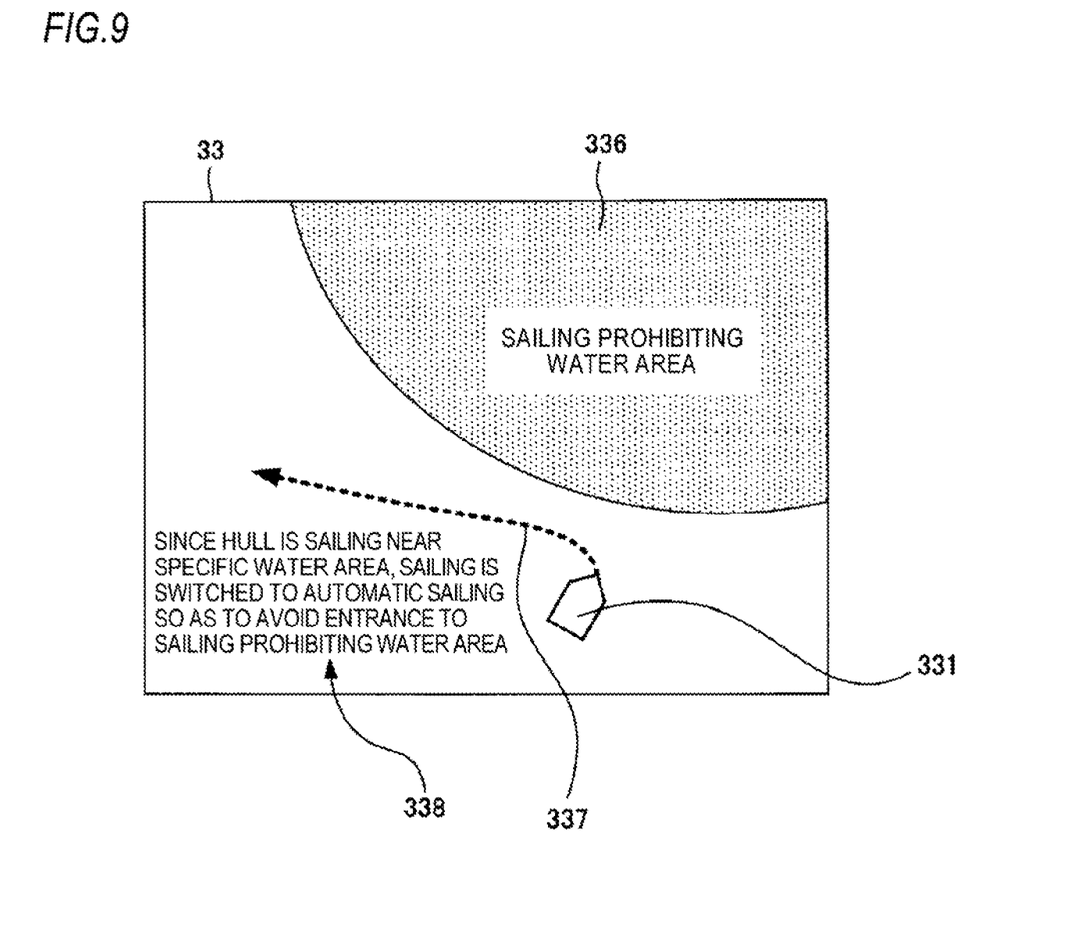
FIG. 9 is a schematic diagram showing an example of a notification operation performed in step S15 shown in FIG. 8.

FIG. 9 is a schematic diagram showing an example of a notification operation executed in step S15 shown in FIG. 8.

As shown in FIG. 9, the notification unit 21d notifies the steersman of the current situation by displaying an image 336 showing the sailing prohibiting water area on the sailing course, an image 331 showing the position of the hull 10 on the sailing course, a message 338 notifying that the hull 10 is sailing near the sailing prohibiting water area and hence, the sailing of the hull 10 is switched to the automatic sailing control to avoid an entrance to the sailing prohibiting water area, and an image 337 indicating a scheduled sailing course of the hull 10 on a display unit 33.

Thereafter, the manual sailing control unit 21E nullifies a manual speed control, a manual shift control, a manual steering control and a manual trim control, shifting to an automatic sailing control in which the automatic sailing control unit 21f controls a throttle motor 23, a steering motor 24, a trim angle control motor 25 and a shift motor 26 irrespective of the operation thereof by the steersman (Step S16).

In Step S16, the automatic sailing control unit 21f controls the sailing course of the hull 10 which is determined based on the positional information of the hull 10 and the direction of the hull 10 detected by the direction sensor 31 by controlling the steering motor 24 such that the sailing course of the hull 10 does not overlap the specific water area which the hull 10 might possibly enter.

In addition, when the distance between the hull 10 and the specific water area is short and the sailing speed thereof is fast, there is a high possibility that the hull 10 enters the specific water area. Therefore, in Step S16, the automatic sailing control unit 21f reduces a throttle valve position to a value which is smaller than the value of the throttle valve position which has been controlled by the manual sailing control unit 21E until then.

Additionally, in Step S16, the automatic sailing control unit 21f controls a trim angle to be an angle at which an optimum riding conformity that matches, for example, the sailing speed can be attained, fixes the trim angle to the value of a trim angle which has been controlled by the manual sailing control unit 21E until then or controls the trim angle to become a value that is determined in advance. In Step S16, the automatic control unit 21f controls the rotational direction of a propeller 27 such that the propeller 27 rotates in a forward direction.

If the determination unit 21c determines that there is no possibility that the hull 10 enters a shallow water area, a water area with sunken rocks or a sailing prohibiting water area (Step S14: NO), in case the automatic sailing control is being executed by the automatic sailing control unit 21f (Step S17: YES), this automatic sailing control is ended, and the control by the manual sailing control unit 21F is resumed (Step S18). Here, it is preferable that the notification unit 21d notifies that the manual sailing control is available.

On the other hand, if the automatic sailing control is not executed by the automatic sailing control unit 21f (Step S17: NO), the flow of operations by the ECU 21 returns to Step S13. The flow of operations also returns to Step S13 after Steps S16 and S18. Then, when the positional information is updated in Step S13, the operations in Step S14 and thereafter are performed again.

Thus, according to the ECU 21 shown in FIG. 7, when there is a possibility that the hull 10 enters the specific water area, the manual sailing is switched to the automatic sailing where the hull 10 is controlled to sail so as not to enter the specific water area. Therefore, the hull 10 can be prevented from entering the specific water area, thereby making it possible to support the safe sailing of the hull 10.

According to the ECU 21 shown in FIG. 7, when there is no possibility that the hull 10 enters the specific water area, the hull 10 can manually be sailed according to the intention of the steersman. Therefore, the steersman can not only sail the hull 10 according to the steersman's preference but also sail the hull 10 freely with no specific destination being determined.

According to the ECU 21 shown in FIG. 7, the images illustrated in FIG. 9 can be presented to the steersman. Therefore, it is possible to eliminate the anxiety felt by the steersman due to the hull 10 being sailed automatically.

The invention is not limited to the embodiment which has been described heretofore and hence can be modified or improved as required.

For example, in the vessel 100 which has been described heretofore, the direction sensor 31 and the GPS receiver 32 may be included in the outboard engine 20. In addition, a configuration may be adopted in which the outboard engine 20 has the sift and throttle controller 34, the steering device 35 and the trim switch 36.

Although the vessel 100 has the outboard engine 20 as the propelling system, the propelling system may be configured by an inboard engine.

DESCRIPTION OF REFERENCE NUMERALS

100 Vessel
10 Hull
10a Transom
20 Outboard engine
21 ECU
21A Positional information acquisition unit
21B Specific water area information acquisition unit
21C, 21c Determination unit
21D, 21d Notification unit
21E Manual sailing control unit
21F, 21f Automatic sailing control unit
22 Communication interface
23 Throttle motor
24 Steering motor
25 Trim angle control motor
26 Shift motor
27 Propeller
28 Storage medium
31 Direction sensor
32 GPS receiver
33 Display unit
34 Shift and throttle controller
34a Shift and throttle lever
340 Remote control box
35 Steering device
35a Steering wheel
36 Trim switch

The invention claimed is:

1. A control device for a propelling system of a vessel comprising:
   a manual sailing control unit configured to control a revolution speed of a propeller included in the propelling system, a posture of the propelling system and a rotational direction of the propeller based on a signal inputted from a controlling device for instructing the revolution speed, the posture and the rotational angle;
   a positional information acquisition unit configured to acquire positional information of a hull to which the propelling system is attached;
   a determination unit configured to determine, based on the positional information and information on a specific water area where sailing is limited, whether the hull stays within the specific water area or there is a possibility that the hull enters the specific water area; and
   an automatic sailing control unit configured to automatically sail the hull by controlling the revolution speed, the posture and the rotational direction when the determination unit determines that the hull stays within the specific water area or there is the possibility that the hull enters the specific water area,
   wherein the control device is configured to shift from control executed by the manual sailing control unit to control executed by the automatic sailing control unit when the determination unit determines that the hull stays within the specific water area or there is the possibility that the hull enters the specific water area.

2. The control device for the propelling system according to claim 1,
   wherein when the determination unit determines that the hull stays within a speed limiting water area as the specific water area where the hull is instructed to sail at a first sailing speed or slower, the automatic sailing control unit controls the revolution speed such that a sailing speed of the hull becomes equal to or slower than the first sailing speed.

3. The control device for the propelling system according to claim 1,
wherein when the determination unit determines that the hull stays within a shallow water area or a water area with sunken rocks as the specific water area, the automatic sailing control unit controls a trim angle of the propelling system as the posture in such a direction that the propelling system moves away from the hull.

4. The control device for the propelling system according to claim 1,
wherein when the determination unit determines that the hull stays within a shallow water area, a water area with sunken rocks or a sailing prohibiting water area as the specific water area, the automatic sailing control unit controls a direction of the propelling system as the posture such that the hull sails out of the specific water area.

5. The control device for the propelling system according to claim 1,
wherein when the determination unit determines that there is a possibility that the hull enters a shallow water area, a water area with sunken rocks or a sailing prohibiting water area as the specific water area, the automatic sailing control unit controls a direction of the propelling system as the posture such that the hull does not enter the specific water area.

6. The control device for the propelling system according to claim 1, further comprising:
a notification unit configured to execute notification when the determination unit determines that the hull stays within the specific water area or there is a possibility that the hull enters the specific water area.

7. The control device for the propelling system according to claim 6,
wherein the notification unit displays a positional relationship between the position of the hull and the specific water area on a display unit.

8. The control device for the propelling system according to claim 7,
wherein the notification unit displays details of automatic sailing, controlled by the automatic sailing control unit, of the hull on the display unit.

9. The control device for the propelling system according to claim 6,
wherein the notification unit displays details of automatic sailing, controlled by the automatic sailing control unit, of the hull on the display unit.

10. The control device for the propelling system according to claim 6,
wherein the notification unit notifies that the control device has shifted from the control executed by the manual sailing control unit to the control executed by the automatic sailing control unit.

11. The control device for the propelling system according to claim 10,
wherein the control device is configured to nullify the control executed by the manual sailing control unit and shift to the control executed by the automatic sailing control unit without intervention of the manual sailing control unit, when the determination unit determines that the hull stays within the specific water area or there is the possibility that the hull enters the specific water area.

12. The control device for the propelling system according to claim 1,
wherein, when the determination unit determines that the hull stays within the specific water area or there is the possibility that the hull enters the specific water area, the control device is configured to nullify the control executed by the manual sailing control unit and shift to the control executed by the automatic sailing control unit without intervention of the manual sailing control unit.

* * * * *